Patented Aug. 5, 1952

2,606,120

UNITED STATES PATENT OFFICE 2,606,120

CHEESE PACKAGE

Frederic Harold Cherepow and George William Forcey, Neenah, Wis., assignors to Marathon Corporation, Rothschild, Wis., a corporation of Wisconsin No Drawing. Application January 31, 1950, Serial No. 141,577

6 Claims. (Cl. 99—178)

This invention relates to an improvement in cheese packaging and more particularly to an improved package or container for cheese and to an improved cheese wrapper.

Marketing cuts of natural cheese in consumer sized units of one, two, five or ten pounds has not been very successful because of the difficulties encountered in obtaining a satisfactory package from the point of view of shelf life, appearance, and ease of opening and using. Natural cheese, and particularly cut natural cheese, has certain properties which present difficult packaging problems, for example, natural cheese evolves, even after aging, a considerable quantity of carbon dioxide. If this evolved gas is not permitted to escape from a package, it will cause the package to bloat and in some cases to even burst. On the other hand, natural cheese is susceptible to oxidation with a resulting development of an off-flavor on the surface of the cheese. Consequently, the cheese must be protected from oxygen. Natural cheese contains a great deal of cheese grease or cheese oil. In large cheddars this cheese grease or oil is partially retained in the cheddar by a skin or rind which develops during aging, whereas, with cut natural cheese the cut surfaces exposed to the wrapper exude this cheese grease. With wrapping materials of the coated type which heretofore have been used on natural cheese this cheese grease attacks the coating and has been responsible for a break-down in the protective features of the wrappers as well as the seals which are made at the time of wrapping. Natural cheese is very susceptible to mold which is due in part to the presence of air and which it has been found can be prevented to some degree by maintaining a wrapper in close intimate contact with the surface of the cheese. Still one further property of natural cheese is that it has a tendency to lose moisture, which loss of moisture results not only in drying of the texture of the cheese but also in a loss of weight.

A successful package of natural cheese, therefore, must be one in which all these various properties are compensated for to the end that the cheese will have a shelf life of about at least three months without any substantial impairment of flavor, without molding, and without losing weight and texture. Furthermore, the package should be in such condition that in handling it is dry to the touch and that its seals have not been impaired in appearance as well as in fact. The package must be readily opened to expose the cheese by simply peeling the wrapper from the surface of the cheese which results only where any coating forming a part of the wrapper adheres to the base sheet and where such coating or film does not readily tear. Any package, which upon opening, requires scraping the cheese surface before the cheese may be used does not meet with consumer acceptance.

The object of this invention is to provide a cheese package or container which meets all the necessary requirements outlined above. It is further an object of this invention to provide a wrapper for wrapping natural cheese which will result in such a cheese package. It is a further object of this invention to provide an improved cheese package of the type wherein the cheese is enclosed in a wrapping material comprising a base sheet having a protective coating thereon which coating is in intimate contact with the surface of the cheese. It is yet a further object of this invention to provide a coated sheet suitable for wrapping cheese, and particularly natural cheese, which sheet will impart to the finished package the aforesaid properties, and to provide a novel coating for such a sheet having optimum properties for use in packaging cheese.

In general our improved cheese container or package comprises a continuous film comprising polyisobutylene, polyethylene, and petroleum wax which encloses the cheese and a second film overlying the first having a limiting minimum value of permeability to carbon dioxide and a limiting maximum value of permeability to oxygen.

We have found that certain materials which are suitable for wrapping have a different permeability with respect to carbon dioxide than they do to oxygen. In our container, therefore, we prefer to use as the second film a material having a sufficiently high carbon dioxide permeability to permit the carbon dioxide evolved by the cheese being packaged to escape and an oxygen permeability sufficiently low to prevent an off-flavor on the surface of the cheese.

We have further determined that for most cheeses a container having an oxygen permeability of not more than about 250 cc./sq. meter/24 hours when measured at 45° F. and 760 mm. of Hg oxygen differential pressure will sufficiently protect the cheese against oxidation to prevent it from acquiring an off-flavor even when stored for as long as six months.

It is difficult to set the minimum value for the carbon dioxide permeability in definite terms since the amount of carbon dioxide evolved depends on the amount of cheese packaged, the age and make of the cheese, the temperature of storage, etc. In general, however, a film having a carbon dioxide permeability of about 278 cc./sq. meter/24 hours measured at 70° F. and 760 mm. carbon dioxide differential pressure will be satisfactory for aged cheese, whereas a permeability of 470 cc. or more is preferred for green cheese.

We have found regenerated cellulose (cellophane) to have the requisite permeability properties for our container. This film also has the desirable property of being printable so that the containers can carry display designs and other advertising indicia. Furthermore we prefer to use cellophane as our outer film in our preferred embodiment of our container because it is more readily coated with the hot melt composition comprising the inner film of our container.

The inner film has high permeability to oxygen and carbon dioxide so as not to alter the control by the outer film and provides our package or container with certain properties not obtainable in films having the necessary properties of our outer film. Moisture proofness or water vapor proofness is the principal property essential to a cheese container not obtainable to a sufficient degree, for example, with a moisture proof cellophane film. The property of "cling," that is, an ability to obtain an intimate contact with, or a superficial adherence to, the surface of the cheese, is another property supplied by the inner film. We have found that where a container clings to the cheese packaged, mold growth is retarded. Still another property supplied by the inner film is the ability to form the container by heat sealing the seams.

These essential properties would be lost were it not for the fact that our inner film is highly grease resistant. Cheese oil or grease which is exuded by cut natural and rindless cheese tends to deteriorate wax-like films or coatings of the type forming a part of the package in U. S. 2,077,300. Deterioration of the coating or film not only destroys the keeping properties of the container, but affects the appearance of the package by destroying the seals, and the convenience of the package by destroying either the adhesion of the inner film or coating to the outer film, or by preventing the peeling of the inner film from the cheese without its disintegration.

The inner film or wax-like coating of our container comprises as the principal components polyethylene, polyisobutylene and petroleum wax. Preferably these components are in the range of proportions by weight set forth below in order to obtain the best protection of a cut natural or rindless cheese with a container formed from a coated wrapping material.

Polyethylene (about 12,000 molecular weight and over) _____ About 3 to about 40%
Polyisobutylene (about 60,000 molecular weight and over) _____ About 25 to about 50%
Petroleum wax_____ About 72 to about 10%

We have found that an inner film in the form of a coating on the outer film comprised of the above materials having the molecular weights indicated in the following proportions:

40% polyisobutylene
10% polyethylene
50% petroleum wax has optimum properties with regard to a completed package as well as to the manufacture of the coated sheet material.

In making our cheese package we prefer to form our inner film by first coating the outer film or base sheet with our new compositions in a melted condition. Our compositions may be blended using a mill or mixer in the conventional manner. The coating is applied in an amount preferably in range of about 30 to about 60 lbs. per ream. (Ream— 24 x 36—500 sheets.) The inner film of our preferred composition should not have a thickness in excess of about .004 and .005 inches for otherwise it tends to impair the carbon dioxide permeability of the package. This can be a conventional "hot melt" coating operation similar to that used in coating sheets with wax-rubber compositions as described in U. S. 2,054,113 and 2,054,115. The resulting coated sheet may be considered as two separate films. This coated sheet is then wrapped about a mass of natural cheese particularly a cut mass with the coated side against the cheese, and portions of the wrapper are over-lapped so as to enclose the cheese completely. The over-lapped portions are then heated to a temperature at which the coating is self-sealing and thus the inner film becomes continuous and the package hermetically sealed.

A number of cheese packages of our invention were prepared as described above wherein the outer film was cellophane and the inner film was a coating on the cellophane. All seams were heat sealed. Certain properties of the packages were determined by visual inspection and rated either poor (P), fair (F), or good (G). The properties tested were: seal, i. e., did the package remain sealed at its seams, adhesion of coating to base sheet, film strength of the coating, and grease resistance of the coating. Grease resistance as previously pointed out indirectly affects the other properties to some degree since it is usually the action of the grease that destroys the coating, hence the seal, and its film strength. In these tests grease resistance refers specifically to the physical condition of the coating.

Two sets of samples were tested under different storage conditions. One set was alternately (alt.) exposed to room temperature during the day and to a temperature of 45° F. at night. This was continued for 21 days after which they were held at 45° F. continuously for 14 days. The other set was refrigerated (ref.) continuously at 45° F. for the period indicated.

The table shows the results of the above tests.

Table

| Test No. | Coating | | | Stor. Condition | Time Tested Months | Properties of Wrapper | | | |
|---|---|---|---|---|---|---|---|---|---|
| | Percent PIB[1] | Percent PE[2] | Percent Wax[3] | | | Seal | Adhesion | Grease Resistance | Film Strength |
| 1 | 20 | 10 | 70 | Alt | 1 | P | P | F | P+ |
| | | | | Ref | 7 | P | P | F | F |
| 2 | 40 | 1 | 59 | Alt | 1 | G | G | P+ | P+ |
| | | | | Ref | 7 | G | P+ | P+ | G |
| 3 | 40 | 10 | 50 | Alt | 1 | G+ | G | F | F+ |
| | | | | Ref | 7 | G | F | G | G |
| 4 | 40 | 20 | 40 | Alt | 1 | G | G | F | G |
| | | | | Ref | 7 | F | P+ | P+ | F |
| 5 | 25 | 10 | 65[4] | Alt | 1 | P+ | P+ | F+ | F+ |
| | | | | Ref | 7 | F | P+ | G | G |
| 6 | 50 | 10 | 40[4] | Alt | 1 | G | G | F+ | F+ |
| | | | | Ref | 7 | | | | |

[1] Molecular weight about 100,000 to about 140,000.
[2] Molecular weight about 18,000 to about 20,000.
[3] 155–160° F. M. P. microcrystalline wax.
[4] 130–132° F. M. P. paraffin wax.

The first two packages, 1 and 2, were made using an inner film outside of the preferred range of proportions specified above for the polyisobutylene in the first case and for the polyethylene in the second. It is seen that the grease resistance is poor in the case of No. 2, whereas the seals are poor in the case of No. 1. Though these wrappers would be suitable for some cheese, they would not keep cut natural or rindless cheese. The other packages incorporated inner films within our preferred ranges specified above. There is a variation in the properties tested among this group of packages also and certain packages or containers are better than others. As to the properties shown in the table, our preferred package, No. 3, appears to be equivalent to No. 4 and No. 6, however, these have higher viscosity coatings than that used in our preferred package which make them more difficult and costly to manufacture.

Not only are there preferred proportions as to the amount of each component necessary to provide a satisfactory package in most cases, but also the molecular weight of the polyethylene and polyisobutylene used is important. We have found that if the molecular weight of the polyethylene is too low, e. g., below about 12,000, the grease resistance of our container is poor. If the molecular weight of the polyisobutylene is too low, the seals and film strength are poor. There is in general no upper limit on the molecular weight and we have found that increasing the molecular weight improves our container. Obviously the viscosity of the composition, however, should be kept within manufacturing limits.

As to the wax portion of our inner film, we have found that any petroleum wax is satisfactory, though we prefer to use a microcrystalline wax.

Although the packages tested all incorporated regenerated cellulose, other films may be used as the outer film of our package, or as the base sheet to receive the coating forming the inner film, which have the requisite carbon dioxide and oxygen permeability. Plastic films having these properties are rubber hydrochloride and polyvinyl alcohol. We have found that the outer film may also be a paper sheet impregnated with microcrystalline wax or a mixture of microcrystalline and paraffin wax.

Though we prefer to make our package using a coated wrapping material, our inner film can be made as a self-sustaining film and the two sheets can be separately applied to the cheese. In this form, however, the package is not as desirable.

Our coating or inner film may be modified without altering its function in so far as our cheese package is concerned by incorporating therein an antimycotic which serves to protect the cheese against mold. Materials such as dimethyl or diethyl dichloro succinate, dehydro acetic acid, and tetramethyl thiourea disulfide have proven to be successful. We have noted particularly that dimethyl dichloro succinate, which is a very fugitive material, is retained in our coating or inner film for longer periods of time than in coatings which do not contain polyethylene and hence it is more effective. Furthermore, wax-compatible resins, e. g., resin derivatives or esters, terpene resins, may be used in place of a portion of the wax to improve adhesion of the inner film to the base sheet.

Other variations and modifications in our cheese package and in our cheese wrapping material with which we prefer to make our package will occur to those skilled in the art. For example, though our wrapping material is a necessary part of our natural, particularly cut natural, cheese package it may also be used as a process cheese wrapper with excellent results.

We claim:

1. A cheese package comprising cheese enclosed in a heat-sealable, grease-resistant, moistureproof container consisting of a base sheet having an oxygen permeability of not more than 250 cubic centimeters per square meter per day at 45° F. and 760 mm. and a carbon dioxide permeability in excess of about 270 cubic centimeters per square meter per day at 70° F. and 760 mm., coated with a continuous film of a composition comprising 10 to 20% of polyethylene having a molecular weight in excess of 12,000, 25 to 50% solid polyisobutylene, and 40 to 65% petroleum wax, said film being present in an amount between 30 and 60 pounds per ream, said film having a gas permeability in excess of the base sheet, said coated sheet inhibiting moisture loss from the cheese packaged in the container and being peelable from the cheese, the carbon dioxide permeability of the coated sheet permitting the carbon dioxide gas generated by the cheese to escape from the package and the oxygen permeability of the sheet preventing oxygen from entering the package in an amount sufficient to cause an off-flavor on the surface of the cheese.

2. A cheese package comprising cheese enclosed in a heat-sealable, grease-resistant, moistureproof container consisting of a base sheet having an oxygen permeability of not more than 250 cubic centimeters per square meter per day at 45° F. and 760 mm. and a carbon dioxide permeability in excess of the oxygen permeability, coated with a continuous film of a composition comprising 10 to 20% of polyethylene having a molecular weight in excess of 12,000, 25 to 50% solid polyisobutylene, and 40 to 65% petroleum wax, said film being present in an amount between 30 and 60 pounds per ream, said film having a gas permeability in excess of the base sheet, said coated sheet inhibiting moisture loss from the cheese packaged in the container and being peelable from the cheese, the carbon dioxide permeability of the coated sheet permitting the carbon dioxide gas generated by the cheese to escape from the package and the oxygen permeability of the sheet preventing oxygen from entering the package in an amount sufficient to cause an off-flavor on the surface of the cheese.

3. A cheese package comprising cheese enclosed in a heat-sealable, grease-resistant, moistureproof container consisting of a sheet of regenerated cellulose coated with a continuous film of a composition comprising 10 to 20% polyethylene having a molecular weight in excess of 12,000, 25 to 50% solid polyisobutylene, and 40 to 65% petroleum wax, said film being present in an amount between 30 and 60 pounds per ream, said film having a gas permeability in excess of the regenerated cellulose sheet, said coated sheet inhibiting moisture loss from the cheese packaged in the container and being peelable from the cheese, the carbon dioxide permeability of the coated sheet permitting the carbon dioxide gas generated by the cheese to escape from the package and the oxygen permeability of the sheet preventing oxygen from entering the package in an amount sufficient to cause an off-flavor on the surface of the cheese.

4. A cheese package comprising cheese enclosed in a heat-sealable, grease-resistant, moistureproof container as defined in claim 2 wherein the base sheet is rubber hydrochloride.

5. A cheese package comprising cheese enclosed in a heat-sealable, grease-resistant, moistureproof container as defined in claim 2 wherein the base sheet is polyvinyl alcohol.

6. A cheese package comprising cheese enclosed in a heat-sealable, grease-resistant, moistureproof container as defined in claim 2 wherein the base sheet is wax impregnated paper.

FREDERIC HAROLD CHEREPOW.
GEORGE WILLIAM FORCEY.

REFERENCES CITED

The following references are of record in the file of this patent:

UNITED STATES PATENTS

| Number | Name | Date |
|---|---|---|
| 2,339,958 | Sparks | Jan. 25, 1944 |
| 2,342,209 | Mitchell | Feb. 22, 1944 |
| 2,363,289 | Bergstein | Nov. 21, 1944 |
| 2,406,990 | Borden et al. | Sept. 31, 1946 |
| 2,480,010 | Flett | Aug. 23, 1949 |